UNITED STATES PATENT OFFICE.

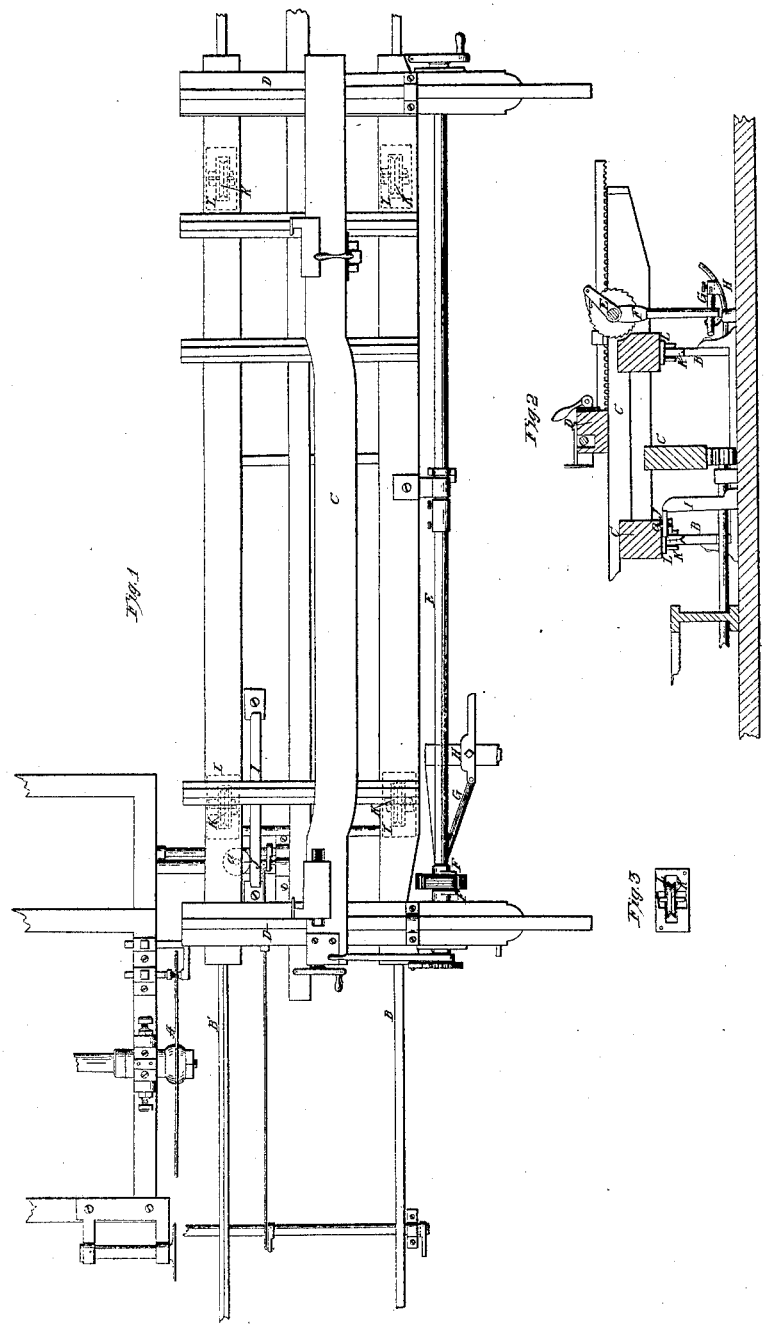

WM. M. FERRY, JR., OF FERRYSBURG, MICHIGAN.

DEVICE FOR GOVERNING LATERAL MOTION OF CARRIAGES IN GIGGING BACK IN CIRCULAR SAWING MACHINES.

Specification of Letters Patent No. 20,150, dated May 4, 1858.

*To all whom it may concern:*

Be it known that I, WM. M. FERRY, Jr., of Ferrysburg, in the county of Ottawa and State of Michigan, have invented a new and useful Improvement in Circular-Saw Mills; and I do hereby declare that the following is a full, clear, and exact description of the same, reference being had to the accompanying drawings, forming a part of this specification, in which—

Figure 1, is a top view of a saw mill with my improvements applied to it. Fig. 2, is a vertical transverse section of the same. Fig. 3, is a plan of one of the boxes in which the journals of the friction wheels of the log carriage turn and play.

Similar letters of reference in each of the several figures indicate corresponding parts.

In saw mills which have the carriage arranged to run upon friction wheels having a lateral movement, by means of offset boxes, from toward the saw while giging back; and which have the feeding head blocks fed automatically by means of an oblique inclined gage bar and ratchet lever, inaccuracies are experienced in the thickness of the boards sawed. This difficulty arising from the wear of the boxes and track and the consequent chance allowed the carriage of being forced from the saw when the feeding ratchet lever comes suddenly in contact with the inclined gage bar and is resisted by said bar in a manner to effect the feeding of the head blocks and yet at the same time to pull over the carriage, head blocks and log, the same distance as the wear of the boxes and rails will allow.

The object of my invention is to overcome these difficulties in a self setting circular saw mill.

The nature of the same consists in providing a short auxiliary rail alongside the inner rail of the log carriage and opposite the oblique inclined gage bar, and furnishing the carriage with an auxiliary wheel which has a vertical axis, and having said wheel come in contact with, and run against the side of the auxiliary rail, and thereby prevent any lateral movement of the carriage other than that necessary to prevent the log rubbing against the face of the saw and heating the same, and also avoid the scratching of the face of the board by the teeth of the saw.

To enable others skilled in the art to make and use my invention, I will proceed to describe its construction and operation.

A, represents the saw.

B, B', is the track upon which the log carriage travels.

C, is the log carriage; D, an adjustable head block; E, the set shaft; F, the set ratchet lever; G, the inclined gage bar, and H, a curved set bar on which the gage bar is adjusted to give different sets to the log.

The saw, carriage, track, set shaft, set ratchet lever, inclined gage bar and curved set bar are arranged in the ordinary or most approved manner and form no part of my present invention.

I is the auxiliary rail. It is arranged alongside the inner rail B' of the main track being attached firmly to the flooring of the mill as shown in Fig. 2 and extending up as high as the bottom of the carriage.

J, is the auxiliary wheel. It is arranged on the bottom of the inner side timber of the carriage and revolves horizontally on a vertical axis *a*. This wheel comes in contact with the side of the auxiliary rail and runs against the same as shown.

K, K, K, K, represent the wheels upon which the carriage B travels. These wheels have their journals hung in offset boxes L, L, L, L, and consequently have a lateral movement by means of the oblique ends of said boxes coming in contact with the ends of the journals as the carriage gigs back, and thus the saw is saved from being rubbed by the log, and the log from being marred by the saw teeth.

By providing the auxiliary rail and the auxiliary wheel, wear and tear of the carriage and rail by lateral play are obviated, as said wheel and carriage prevent any sudden lateral vibrations of the carriage during the commencement of the setting operation. The carriage with the log on it however, has a chance, by means of the offset boxes, to move laterally to the right at the commencement of the gigging back operation so as to clear the log of the saw, and thus prevent heating and buckling of the saw and save the face of the boards from being marred by the teeth of the saw; but when the setting operation commences and during its completion, the carriage is held positively by the auxiliary rail and wheel and kept from lateral play to the right. As soon as the set is accomplished and the carriage reversed, the offset boxes force the carriage laterally to the left so as to compensate for the lateral movement which it took in order to clear the log of the saw.

What I claim as my invention and desire to secure by Letters Patent, is—

Providing a short auxiliary rail I, alongside the inner rail of the log carriage C, and opposite the oblique inclined gage bar G', and furnishing the carriage with an auxiliary wheel J, which has a vertical axis $a$, and having said wheel come in contact with, and run against the side of the auxiliary rail and thereby prevent any lateral movement of the carriage other than that necessary to prevent the log rubbing against the face of the saw and heating the same and also avoid the scratching of the face of the board by the teeth of the saw, substantially as and for the purposes set forth.

WM. M. FERRY, JR.

Witnesses:
JAMES L. SCOTT,
ED. P. FERRY.